United States Patent
Knapp

(10) Patent No.: US 9,586,358 B2
(45) Date of Patent: Mar. 7, 2017

(54) BLOW MOULDING MACHINE WITH COOLING OF THE BASE IN THE STABILIZATION PHASE

(71) Applicant: KRONES AG, Neutraubling (DE)

(72) Inventor: Peter Knapp, Schmatzhausen (DE)

(73) Assignee: KRONES AG (DE)

( * ) Notice: Subject to any disclaimer, the term of this patent is extended or adjusted under 35 U.S.C. 154(b) by 727 days.

(21) Appl. No.: 13/864,827

(22) Filed: Apr. 17, 2013

(65) Prior Publication Data

US 2014/0145377 A1   May 29, 2014

(30) Foreign Application Priority Data

Apr. 17, 2012   (DE) .................. 10 2012 103 349

(51) Int. Cl.
| | | |
|---|---|---|
| *B29C 49/18* | (2006.01) | |
| *B29C 49/12* | (2006.01) | |
| *B29C 49/36* | (2006.01) | |
| *B29C 49/58* | (2006.01) | |
| *B29C 49/64* | (2006.01) | |
| *B29C 49/66* | (2006.01) | |
| *B29C 49/78* | (2006.01) | |

(52) U.S. Cl.
CPC .............. *B29C 49/18* (2013.01); *B29C 49/12* (2013.01); *B29C 49/36* (2013.01); *B29C 49/58* (2013.01); *B29C 49/64* (2013.01); *B29C 49/66* (2013.01); *B29C 49/783* (2013.01); *B29C 2049/1228* (2013.01); *B29C 2049/5841* (2013.01); *B29C 2049/6692* (2013.01)

(58) Field of Classification Search
None
See application file for complete search history.

(56) References Cited

U.S. PATENT DOCUMENTS

2008/0164642 A1 *   7/2008   Hirdina .................. B29C 49/18
264/528

FOREIGN PATENT DOCUMENTS

| DE | 600 15 577 T2 | 3/2005 |
|---|---|---|
| DE | 10 2004 014 653 A1 | 10/2005 |
| DE | 20 2008 005 393 U1 | 8/2008 |
| DE | 10 2007 015 105 A1 | 10/2008 |
| JP | 7-156259 A | 6/1995 |
| WO | 2008/000704 A2 | 1/2008 |

OTHER PUBLICATIONS

EP Search Report dated Aug. 7, 2013, issued in related European Application No. 13163137.6.
German Search Report dated Dec. 14, 2012, issued in counterpart German Application No. 10 2012 103 349.8.

* cited by examiner

*Primary Examiner* — Jacob T Minskey
(74) *Attorney, Agent, or Firm* — Hayes Soloway P.C.

(57) ABSTRACT

In a blow moulding machine for the production of plastics material containers, during a blow mould procedure, the container to be expanded is supplied with blow moulding air from a first gas preparation device on the one hand or from a second gas preparation device on the other hand. During this procedure a cooling of the base of the container is additionally carried out.

20 Claims, 8 Drawing Sheets

BLOW MOULDING MACHINE WITH COOLING OF THE BASE IN THE STABILIZATION PHASE

CROSS-REFERENCE TO RELATED APPLICATION

This application claims the benefit of priority of German Patent Application No. 10 2012 103 349.8, filed Apr. 17, 2012, pursuant to 35 U.S.C. 119(a)-(d), the disclosure of which is incorporated herein by reference.

TECHNICAL FIELD

The present disclosure relates to an apparatus and a method of producing plastics material containers and, in particular, for shaping plastics material pre-forms into plastics material containers.

BACKGROUND

Apparatuses and methods of producing plastics material containers have long been known from the prior art. It is usual for plastics material pre-forms first to be heated by means of a furnace and for these plastics material pre-forms heated in this way then to be shaped in a blow moulding machine, in particular a stretch blow moulding machine, into the containers by being acted upon with blowing air. This shaping process is a relatively complicated process in this case and it is usually divided into a multiplicity of part steps. In this way, the container is expanded with a preliminary blow moulding pressure, then a finishing blow moulding pressure is usually applied and finally the container expanded in this way is held at this pressure for a pre-set time, so that the deformed state can be stabilized.

Apparatus and methods are also known from the prior art in which the containers are cooled during the shaping process or in part after it, in particular in a base region, in order to stabilize the base region in this way. In addition, other procedures are also known for achieving this base stability. In this way, it is known for base after-cooling by air or water variants to be arranged at the exit of a blow moulding machine of this type. After-cooling in this way, however, results in various drawbacks. In the case of cooling with an air blower the ideal conditions can be achieved only in the rarest cases. In this way, in the case of a vortex nozzle for example, there is unnecessary air consumption. Even in the case of a blow moulding variant, ideal installation conditions occur only rarely. An after-cooling of the base by means of water has the drawback that the containers are subsequently moistened or wetted with water, and this in turn constitutes a problem for a subsequent labelling.

Therefore, it may be desirable to make available an apparatus and a method which will make the production of containers more energy-efficient. In particular, an apparatus and a method should be made possible in this case which allow the cooling of specified regions of the container, in particular a base, during the blow moulding.

SUMMARY

According to various aspects of the disclosure, an exemplary apparatus for the expansion of plastics material containers has a conveying device which conveys the plastics material containers along a pre-set conveying path. In addition, the apparatus has at least one first shaping station which is arranged on the conveying device and is conveyed by the conveying device and which expands the plastics material containers by acting upon them with a gaseous medium (or in which the plastics material containers are expanded). Besides this or in addition, it is also possible for the plastics material containers to be cooled by passing through a gaseous medium. Furthermore, a second shaping station is provided, which is arranged on the conveying device and is conveyed by the conveying device and which expands the plastics material containers by acting upon them with a gaseous medium. Furthermore, the first shaping station and the second shaping station have stretch rods in each case for rotating the plastics material containers to be expanded in the longitudinal directions thereof and these stretch rods have in each case a channel by way of which a gaseous medium is capable of being supplied through the stretch rod to the plastics material containers to be expanded.

Furthermore, the apparatus has a first gas preparation device which makes a gaseous medium under pressure available at least for a time to the first shaping station, in which case this gaseous medium is capable of being supplied at least for a time through the stretch rod to this plastics material container to be expanded in the first shaping station. In this case it is possible for the first gas preparation device to make the gaseous medium under pressure available to the first shaping station for the expansion of a plastics material container to be expanded in the second shaping station and/or for the maintenance of a state of expansion of this plastics material container and/or for the cooling of the plastics material container. The expression "the expansion of the container" is to be understood in the following as also being the entire process including any stabilization and cooling phases.

According to the disclosure the apparatus has a second gas preparation device which is capable of being connected in terms of flow to an inner space of the plastics material container to be expanded in the first shaping station, in such a way that a gas flowing between the second gas preparation device and the inner space of the plastics material container flows between the stretch rod and a wall of the plastics material containers, the first gas preparation device and the second gas preparation device being connected in terms of flow at least for a time by way of the inner space of the plastics material container arranged in the first shaping station and this second gas preparation device also being connected in terms of flow at least for a time to a plastics material container present in the second shaping station and the pressure ratios of the first gas preparation device and of the second gas preparation device being selected in such a way that a gas flow from the second gas preparation device to the first gas preparation device—in particular by way of the plastics material container present in the first shaping station—takes place at least for a time.

It would also be possible for stretch rods which stretch the containers not to be used in individual apparatus, but, alternatively, for flushing rods to be used which are introduced into the interior of the containers in order to cool the interior of the container, in particular the base or side walls thereof which, however, then do not necessarily carry out a stretching procedure of the containers. It may be preferred for the stretch rods to be flushing rods which make it possible to flush or cool the container by the supply of a medium.

It may be preferable for the second gas preparation device to be used for acting upon the container with gas in such a way that the internal volume thereof is increased. The increase in volume of the plastics material container (in particular present inside a blow mould) may therefore be preferably caused by the second gas preparation device. It may therefore be preferable for the second gas preparation device to make the pressure available for carrying out the finishing blow mould procedure.

An apparatus is thus proposed according to the disclosure, in which at least two gas preparation devices are available, which in this case, however, communicate in particular by way of the inner space of at least one container to be expanded. In this situation, for example a gas, which is used for cooling a container to be expanded or a container which already been expanded, can in turn be made available to a further shaping station. In other words, in at least one moment in time the air flowing through the stretch rod is used for cooling and is made available at the same time at least indirectly to a further blow moulding station or shaping station. An existing flow connection between the gas preparation devices should be taken to mean, in particular, that valves in the region of the flow connection are opened at least in part.

In the case of an exemplary embodiment a compressor device is provided which supplies at least one gas preparation device with compressed air and which may preferably also supply the second gas preparation device with compressed air at least for a time. It may be preferable in this case for the second gas preparation device to be fed by the compressor during the starting procedure of the blow moulding machine.

As well as the two gas preparation devices named above, it is also possible for further gas preparation devices to be provided for supplying the shaping stations. In this way for example, a gas preparation device in the form of a preliminary blow moulding channel and/or in the form of a finishing blow moulding channel and/or in the form of a PI channel and/or in the form of an (air) preparation channel can be provided.

The conveying device may in some aspects be a rotatable conveying device and, in particular, a blow moulding wheel on which at least the two shaping stations are arranged. It may be advantageous for a plurality of shaping stations, for example eight shaping stations, twelve shaping stations or the like, to be arranged on the conveying device.

It may be advantageous for the shaping stations mentioned above to have blow moulds in each case, into which the plastics material pre-forms can be introduced for the expansion thereof and from which the subsequently produced containers can be removed again. In this case it may be advantageous for these blow moulding stations to be capable of being folded, in particular capable of being folded in order to be able to introduce a plastics material pre-form subsequently.

In the case of a further exemplary embodiment the blow moulding stations have in each case a blow moulding nozzle which is capable of being placed against an aperture of the containers to be expanded. As mentioned above, a flow path of the expansion medium, in particular the blowing air, extends at least locally through the stretch rod. A further flow path may extend advantageously between the stretch rod and a wall of the plastics material container, in particular between an external periphery of the stretch rod and an aperture of the container to be expanded.

It may be advantageous for a control means to be provided which permits a guidance of the blowing air in both directions for at least one of these two flow paths, in some aspects for both the flow paths, i.e. into the container and out of the container.

In the case of a further exemplary embodiment the pressure ratios of the first gas preparation device and of the second gas preparation device are chosen at least for a time in such a way that the pressures made available by these gas preparation devices differ from one another at least for a time by less than 30%, in some aspects by less than 20% and in some aspects by less than 10%. In this way it is possible for a cooling of a region of the container, in particular the base, to be capable of being carried out at the same time during a phase of the expansion process, in particular during a stabilization phase. It may be advantageous, at least for a time during this phase, for a pressure made available by the first gas preparation device at a specified shaping station to be slightly higher than the pressure made available by the second gas preparation device. In this case it may be possible for at least one gas preparation device and preferable for both gas preparation devices to be designed in the form of pressure channels which supply a plurality of shaping stations and, in a particularly preferred manner, all the shaping stations of the apparatus with compressed air.

In the case of a further exemplary embodiment the second shaping station is arranged downstream of the first shaping station with respect to the conveying movement of the plastics material pre-forms or plastics material containers. This means that that container which is already cooled in the first shaping station has already advanced further in the framework of the finishing process than the container arranged on the second shaping station mentioned above. This means that a flow of blowing air flows from the first preceding shaping station to a second following shaping station. In other words the flow which is used for the expansion and/or cooling of a first plastics material container may preferably also be used for the expansion and/or stabilization of a second plastics material container.

A flow of this type can be achieved by a suitable circuitry with valves.

In the case of a further exemplary embodiment the first gas preparation device makes the gaseous medium under pressure (in particular the medium available to the second shaping station) available for a time for the expansion and/or stabilization of a plastics material container arranged in the second shaping station. It may be advantageous for the two gas preparation devices to be connected in terms of flow—preferably at different time periods in each case—to different shaping stations or to the plastics material pre-forms present in these shaping stations.

In this case the first gas preparation device can also make the gas available to the second shaping station by way of the first shaping station or by way of the container present in the first shaping station respectively (and/or also directly).

In the case of a further exemplary embodiment the apparatus has a control device which has the effect that the period of time in which the first gas preparation device makes the gaseous medium available to the first shaping station and the period of time in which the first gas preparation device makes the gaseous medium available to the second shaping station are staggered at least in part.

In the case of a further exemplary embodiment the apparatus has a control device which has the effect that the period of time in which the first gas preparation device makes the gaseous medium available to the first shaping station and the period of time in which the second gas preparation device makes the gaseous medium available to the second shaping station are simultaneous and/or staggered at least in part.

This means that the plastics material containers are expanded at different times. The control device can be for example a valve control means which controls valves of the blow moulding process. It may be advantageous for each individual shaping station to have at least one and preferably a plurality of valves allocated to it. The control device can control the blow moulding processes in the individual shaping stations by a suitable actuation of the aforesaid valves. In this case it may be advantageous for this control device to be designed in such a way that air is also conveyed for a time by way of the individual stretch rods or flushing rods into the plastics material containers.

In the case of a further exemplary embodiment the apparatus has a plurality of shaping stations, and all the shaping stations are connected in terms of flow to the first gas preparation device at least for a time. It may be advantageous for all the shaping stations also to be connected in terms of flow to the second gas preparation device at least for a time. This flow connection can be formed in this case by way of the blow moulding nozzles which in each case are component parts of the individual shaping stations.

In the case of a further exemplary embodiment, as mentioned above, at least one gas preparation device is a channel and preferably an annular channel.

In the case of a further exemplary embodiment at least one stretch rod has a gas outlet opening in an end portion of the stretch rod. By way of this opening a cooling of the base of the containers can be achieved in each case. It may be advantageous for the end portion of the stretch rod to be an end portion which is brought to the base of the containers during the shaping process. It may be advantageous for this end portion to be used to extend the container by stretching along a longitudinal direction. It may be preferable for this opening to be the single opening of the stretch rod which can also be referred to as a flushing rod. It would also be possible, however, for a plurality of openings, for example oblique openings, to be provided, by way of which the gaseous medium can flow out in a direction oblique to the longitudinal direction and, in particular, directed towards the base of the containers.

The present disclosure further relates to a method of expanding plastics material containers, in which the plastics material containers are expanded by means of a plurality of shaping stations by being acted upon with a gaseous medium and in which the gaseous medium is made available by a first gas preparation device and is supplied at least for a time through a stretch rod to a plastics material container present in a shaping station.

According to the disclosure the first shaping station is connected in terms of flow to a second gas preparation device at least for a time during the supply of the gaseous medium to the plastics material container present in this first shaping station and this second gas preparation device is connected in terms of flow at least for a time to a second shaping station. In this case a flow connection extends between this second gas preparation device and the first gas preparation device at least locally between a stretch rod and an aperture of the container.

It is therefore also proposed with respect to the method that the pressure of a gaseous medium, which is used for cooling the base or for cooling areas of the containers, should also be used for a further shaping station for the expansion of the containers.

It may be advantageous for the containers to be conveyed during the expansion thereof. It may be preferred for the second shaping station to be arranged downstream of the first shaping station along a conveying path of the containers.

In the case of a further exemplary method the supply of the gaseous medium is directed through the stretch rod to a portion of the container in order to stabilize this portion of the container. In particular, the portion of the container is a base of the container.

It may be advantageous for the first gas preparation device to have at least for a time a pressure which is higher by at most 30%, in some aspects higher by at most 20%, and in some aspects higher by at most 10%, than the second gas preparation device.

In particular, on account of these relatively low differences in pressure, a purposeful cooling of one container with a pressure allocation to a further container can be achieved, in particular simultaneously.

It may be advantageous for the container to be expanded even before the supply of the gaseous medium through the stretch rod by being acted upon with a gaseous medium. This means that the circuits described here, i.e. the use of pressure for cooling the container, are used in a purposeful manner only with or after the actual shaping of the container.

It may be advantageous for the container first of all to be acted upon with a preliminary blow moulding pressure, and then in a particularly preferred manner with a finishing blow moulding pressure which is used for shaping the container, and finally with a pressure which is intended to stabilize the shaped container.

In the case of a further exemplary method the container is released from pressure after the expansion thereof, and it may be preferable for a gas formed in the course of this pressure release to pass through the stretch rod at least also for a time. This means that this time period of the pressure release can also be used for the further cooling of the container or the base thereof respectively.

It may be advantageous for the expansion of the plastics material container in the first shaping station and the expansion of the plastics material container in the second shaping station to take place in a manner staggered in time from each other.

In the case of a further exemplary method different pressure levels are also made available in the production of the plastics material containers.

In the case of a further exemplary method essentially (or virtually) the same pressure level is present in the first gas preparation device, in the container and in the second gas preparation device at least for a time and preferably permanently during the finishing blow moulding of a container and/or during the flushing of the container.

This means that these pressure ratios or pressures differ from one another by less than 30%, in some aspects by less than 20%, in some aspects by less than 10%, and in some aspects by less than 5%, during these aforesaid phases of the finishing blow moulding and/or the flushing (preferably during both phases). On account of this small difference in pressure it is possible to maintain in a purposeful manner the internal pressure of the container and nevertheless a low flow of the medium in order to cool the base area. In this case it is possible for the pressure to decrease in a gradual manner from the second gas preparation device to the first gas preparation device (or, if desired, also in the reverse direction).

Further advantages and embodiments will become evident from the attached drawings.

DETAILED DESCRIPTION

Figure 1:
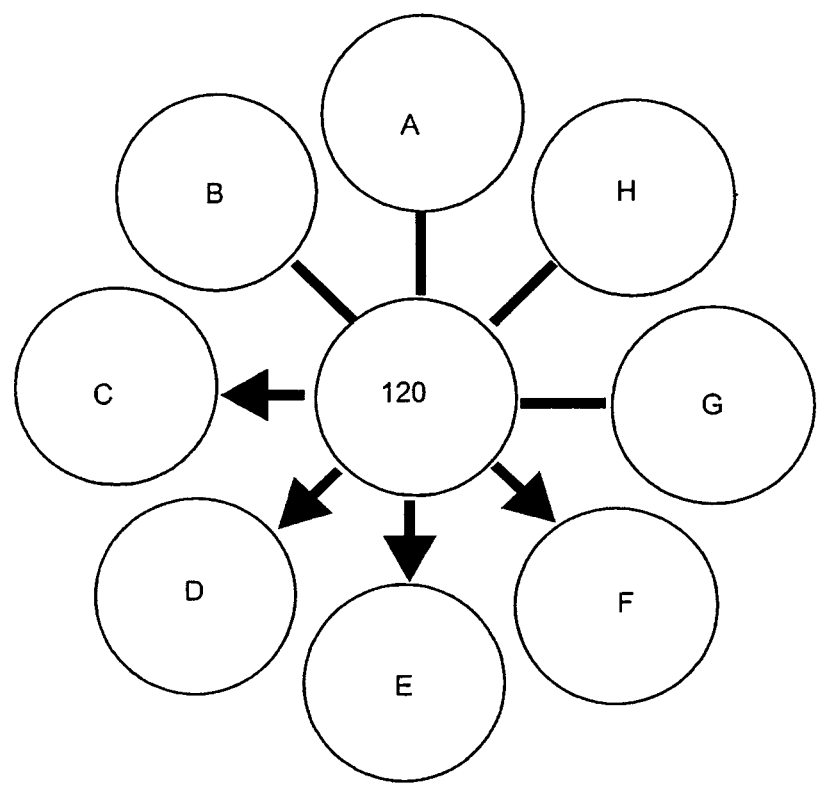
FIG. 1 is a diagrammatic illustration of a shaping procedure according to the prior art.

FIG. 1 is a roughly diagrammatic illustration of the sequence of a method according to the prior art. In this case a blow moulding machine with eight stations A to H is illustrated roughly diagrammatically. In this case (as also in FIG. 2) the letters designate the following states of the method:

A: opened blow mould;
B: transfer of a plastics material pre-form into the blow mould;
C: formation of the container—in particular by being acted upon with pressure;
D: the container finished and kept under pressure;
E: the container finished and kept under pressure;
F: the container finished and kept under pressure;
G: the container relaxed (released from pressure); and
H: transfer of the finished container out of the blow mould.

The reference number 120 designates roughly diagrammatically a reservoir or a unit for making available preliminary and finishing blow moulding air. The individual shaping stations are preferably designed in an identical manner and they preferably move anti-clockwise in this case.

Figure 2:
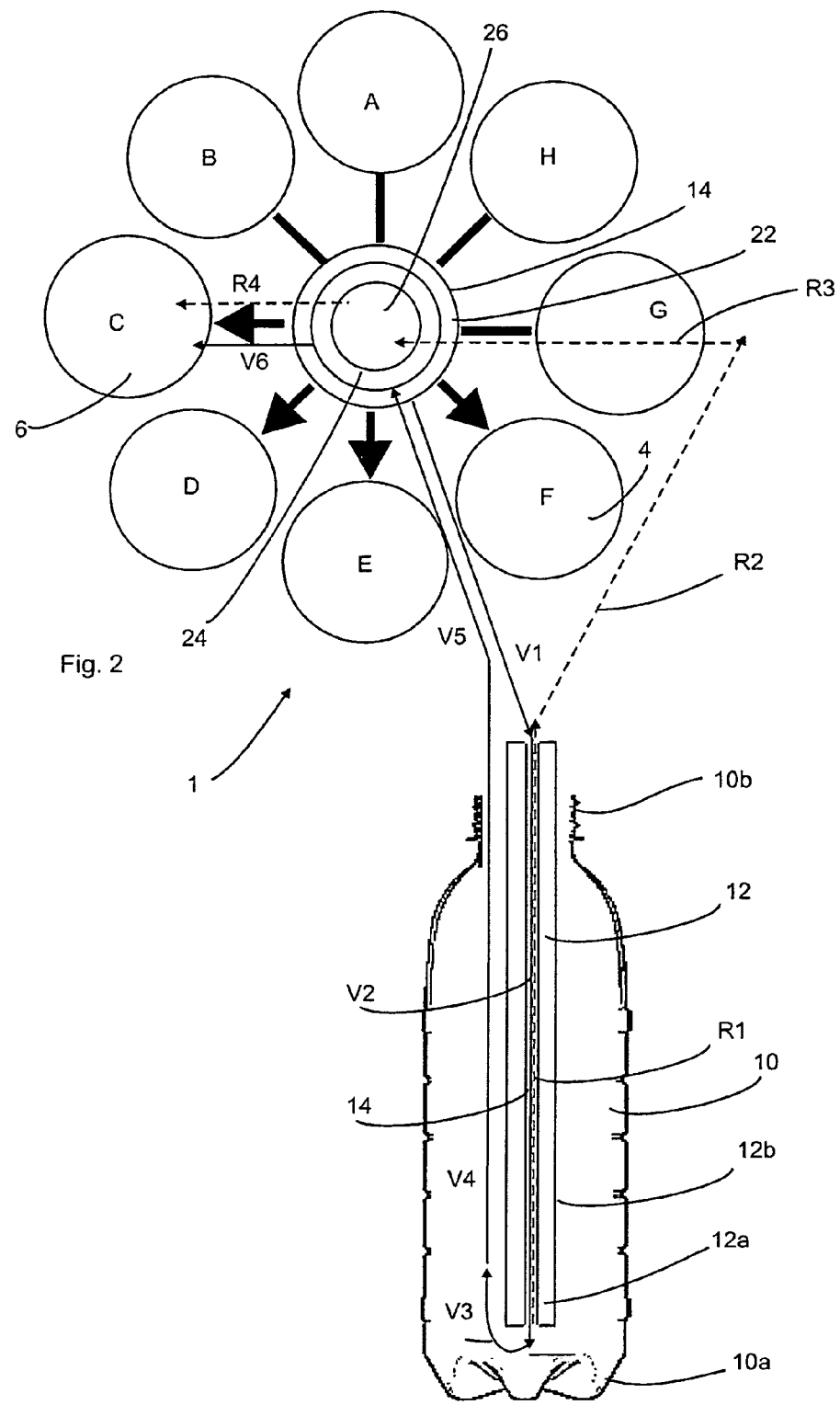
FIG. 2 is a diagrammatic illustration of an exemplary shaping procedure according to the disclosure.

FIG. 2 shows an embodiment according to the disclosure. In this case too, a blow moulding machine 1 is again illustrated with the stations already described with reference to FIG. 1. The reference number 4 in this case designates the first shaping station and the reference number 6 designates a second shaping station. All the shaping stations are arranged on a common carrier or a common conveying device respectively.

Whereas the illustration given in FIG. 1 shows the known principle with preliminary and finished blow moulding as well as pressure and cooling phases with subsequent relaxation, the second illustration shows a blow moulding wheel 14 with eight stations in the blow moulding process. In this case, however, an additional preparation channel 22, i.e. the first gas preparation device 22, is provided.

In the situation shown in FIG. 2 the flushing air is introduced into the container 10 through a stretch rod 12, more precisely by way of a base 12a of the stretch rod 12. In this phase the base 10a of the container is actively cooled from the inside. The gas preparation device 22 is fed directly from a compressor (not shown) in this case. In addition, in the method now proposed the container is produced as before by means of preliminary and finishing blow moulding, but nevertheless the blow moulding air does not now originate directly from a compressor but it is redirected. Expressed more precisely, the blow moulding air is conveyed from a compressor into the first gas preparation device 22. From there the blow moulding air is conveyed by way of the flushing or stretch rod 12, which preferably has an opening only in the base area 12a, through the already completely shaped containers to a finishing blow moulding channel 24, i.e. to the second gas preparation device 24, in the pressure and cooling phase. The air is conveyed in this case between an external periphery 12b of the stretch rod 12 and an inner wall of the aperture 10b of the container 10.

With a feed in this way, this first preparation device 22 feeds the three shaping stations designated with the letters D, E and F by way of the container itself. The containers 10 on the other hand are under the finishing blow moulding pressure (starting from the second gas preparation device 24), i.e. essentially the same pressure level is present in the first gas preparation device 22, in the containers (during the pressure and cooling phase) and in the finishing blow moulding channel or the second gas preparation device 24 respectively. In this case a sort of open system is present when air is flowing. On the other hand, only so much air can flow through the containers as is consumed for the production of the containers by way of the second gas preparation device 24, i.e. the finishing blow moulding channel.

This procedure is indicated by the solid arrows V1 to V5.

During the release procedure, i.e. in this case in the shaping station which is designated with the letter G, on the one hand air can first flow out of the container again for example by way of the stretch or flushing rod 12, more precisely through the channel 14 present in the stretch rod, and can thus preferably be recycled into the intermediate blow moulding channel. This flow is indicated in this case by the arrows R1 to R3. In this way, a cooling action can once again be produced in the base area 10a of the container. The air issuing in this way is collected by way of a further gas preparation device 26 (so-called air wizards) and can be further processed in a known manner. On the other hand, the air can also be released out of the container into an outlet channel. This air can then be conveyed by way of the aperture of the container. After that, the air passes out of the finishing blow moulding channel into the second shaping station 6 indicated with the letter C and is also jointly used in this region for forming the container.

In order to ensure as high as possible a degree of efficiency of the blow moulding air generally, it is possible for the respective release air (shaping station G) to be collected by way of air wizard systems or recycling systems respectively. The air consumption is not increased as a result, but only used more effectively, since a passage extends through the already finished containers 10 in order to produce new containers. In addition, a parallelization of the air paths can be achieved, since a plurality of flushing or stretch paths 12 can operate simultaneously. In this way, the air consumption is also not increased. On account of the apparatus according to the disclosure an after-cooling of the base of the plastics material containers can be generated without additional consumption of air.

As a result of the constantly higher output of the stations, the cooling time in the station also automatically becomes increasingly short during the blow moulding process. The disclosure allows a greater stability of the base since the actual geometry of the shape of the base is better retained. The cooling action is considerably more efficient on account of the double effect, i.e. a cooling from the inside and outside (on account of the flow of air through the stretch rod in both directions) and so deformation of the geometry of the base virtually no longer occurs.

In addition, a wetting of the outer skin of the container with water can be omitted, which may be advantageous in particular in the case of machines arranged in a group or synchronized with one another. The base 10a of the container should also be cooled on the other hand upstream of a labelling machine (in particular in the case of so-called CSD containers), which until now has been carried out by way of an after-cooling of the base with water. These bottles wetted with water can be labelled only with difficulty.

It may be preferable for the stretch or flushing rod illustrated in FIG. 2 to be designed in a multiplicity of parts and preferably at least in two parts. In this case it is possible for this stretch rod 12 to have a main segment which can always be designed in the same way. A corresponding shaping segment, or pre-form segment, can be made interchangeable by means of a suitable closure, for example a bayonet closure. This part of the flushing or stretch rod is the region which is shown in FIG. 2 and which also dips into the plastics material pre-form.

In principle, it would also be possible for use to be made of one-piece flushing or stretch rods which then, however, usually have a standardized diameter (for example of 14 mm). With these diameters, however, the stretch rod or flushing rod cannot be introduced into all plastics material pre-forms and so a divisible flushing rod or a flushing rod capable of being assembled is provided in this case. In this case the pre-form segment of the stretch or flushing rod shown in FIG. 2 can be provided with variable diameters, for example of 8, 10, 12 and 14 mm. In this way, plastics material pre-forms of different cross-sections or diameters respectively can also be produced.

Figure 3A:
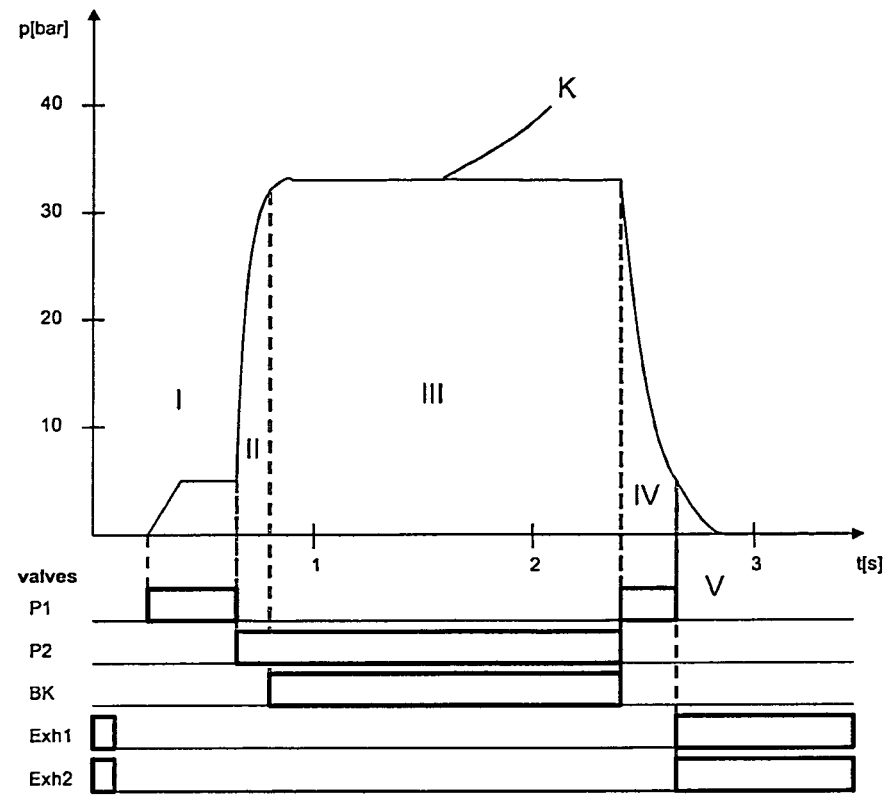
FIGS. 3a, 3b are an illustration of a blow moulding procedure according to the disclosure in continuous operation.
Figure 3B:
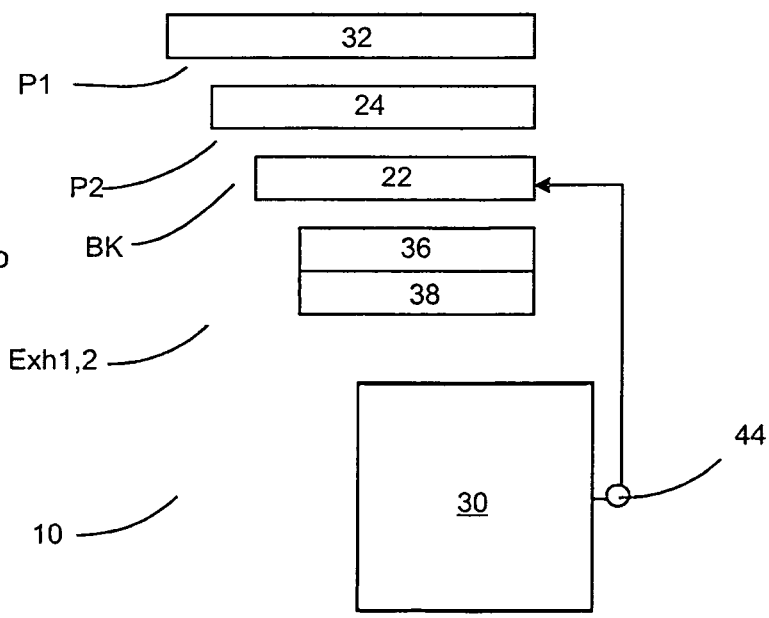

FIGS. 3a and 3b are a representation of a method according to the disclosure. In this case the curve K relates to a pressure pattern inside the plastics material pre-forms during a blow moulding procedure. The blow moulding procedure has in this case a plurality of phases or portions I to V. The references P1, P2, BK, Exh1 and Exh2 designate a plurality of valves, namely the valves for a preliminary blow moulding pressure (P1), for a finished blow moulding pressure (P2), i.e. the second gas preparation device 24, the valve for the preparation channel (BK) and two outlet valves Exh1 and Exh2. During the blow moulding process a preliminary blow moulding of the containers is first carried out in a process stage I. In this region the pressure rises to a pressure of approximately from 3 to 7 bar. After that, a complete shaping of the containers is carried out in a relatively short portion II, this corresponding to the shaping station 6 which is illustrated in FIG. 2 and which is also provided with the sign C. In a further longer phase III a specified pressure is maintained in the container in order to stabilize it. This corresponds in FIG. 2 to the shaping stations D, E and F. As well as the valves or channels shown, it is also possible for a further channel to be provided which supplies a pressure cushion (preferably present in the shaping stations) with compressed air. Pressure cushions of this type are used in order to compress more strongly the two blow mould parts during the expansion process.

After that, the container is released (stage 4) and, finally, air still remaining in the last stage 5 can be discharged by way of an outlet valve. The rectangles in the respective FIGS. 3a, 4a, 5a, 6a, 7a and 8a in each case indicate the state in which the respective valves are opened. A difference as compared with the prior art is evident, in particular, in portion 3, in which the container is supplied with compressed air both by way of the finishing blow moulding channel (past the stretch rod)—i.e. by way of the second gas preparation device—and by way of the first gas preparation device 22 (through the stretch rod), in which case an approximate equilibrium occurs between the two supplies.

In general, within the scope of this application a gas preparation device is to be understood as being a device which can prepare a gas, in particular air, in particular as a working gas. It may be preferable for this gas preparation device to be capable of producing the gas under a pressure which is above atmospheric pressure. It may be advantageous for the gas preparation devices described here also therefore to be designed in the form of gas reservoirs which can store gas—in particular also at the pressure mentioned above.

In the lower part of the figure a compressor 30 is illustrated as well as various reservoirs or channels respectively. In detail, the reference number 32 designates a preliminary blow moulding channel, the reference number 24 the finishing blow moulding channel or the second gas preparation device respectively, the reference number 22 the first gas preparation channel and the reference numbers 36 and 38 outlet channels in each case. In this case the compressor supplies the gas preparation channel 22 with blow moulding air.

The reference number 44 designates a valve by which the supply of the blow moulding air to the first gas preparation device can be controlled.

In this way, FIG. 3a relates to a continuous working operation of the plant. It is evident that first of all the valve P1 for the preliminary blow moulding channel is opened and, after that, at the beginning of portion II the valve for the finishing blow moulding channel is also opened. As soon as a maximum pressure is achieved, the valve BK for the preparation channel is now also opened. These two valves are kept opened in each case during the stabilization of the container and, as mentioned above, have similar pressures, in which case it may be preferable, however, for the pressure in the preparation channel to be slightly higher, so that a flow to the finishing blow moulding channel or the second gas preparation device 24 respectively can take place.

After the end of portion III both the valve P2 and the valve BK are closed and, on the other hand, the valve P1 is opened again, so that air can flow back again into the preliminary blow moulding channel 32. In this way, a recycling of the air pressure can be achieved. As from portion V the valve P1 is also closed and, in addition, the two outlet valves Exh1 and Exh2 are opened. This residual air can be discharged from the system to the outside. The pressure in the preliminary blow moulding channel is lower than that in the first and the second gas preparation devices 22, 24.

Figure 4A:
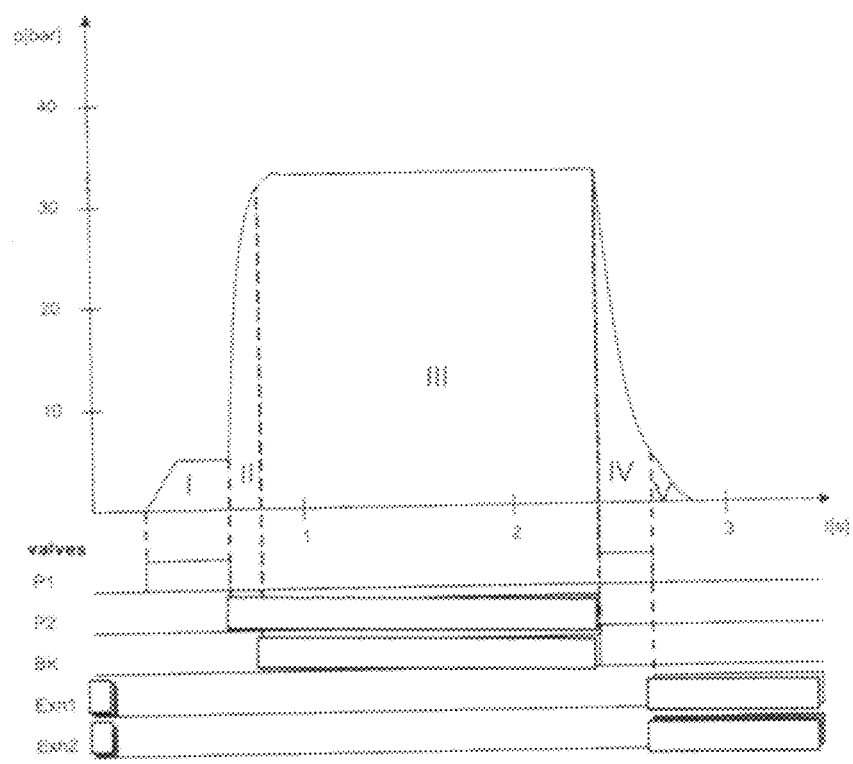
FIGS. 4a, 4b are an illustration of a blow moulding procedure at the beginning or after a gap which has been formed.
Figure 4B:
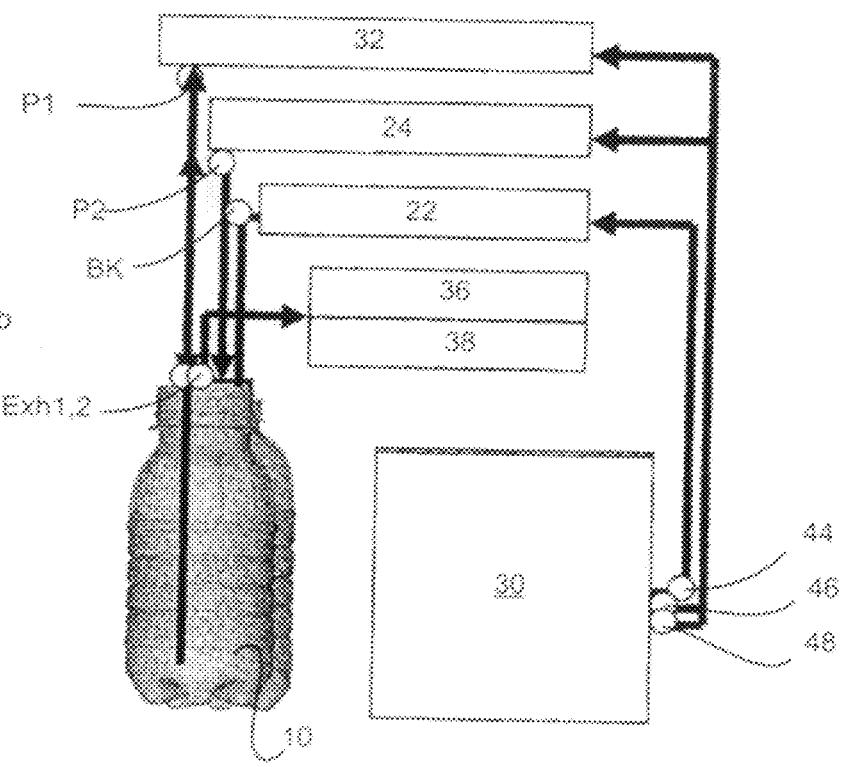

FIGS. 4a, 4b show the special case in which just the working operation is started, or a first container is shaped out. In this situation all the channels 32, 24 and 22 are supplied with compressed air by the compressor 30 in order to achieve a specified pressure level. The actual working process illustrated in FIG. 4a corresponds, however, to the working process also described with reference to FIG. 3a. Valves 44, 46, 48 can additionally be provided in this case between the compressor 30 and the first and/or the second gas preparation device 24, 22 and the preliminary blow moulding channel 32 in order to control the compressed air supply of the channels.

As well as the valve 44, the valves 46 and 48 are shown here, which control the air supply to the second gas preparation device 24 and the channel 32.

Figure 5A:
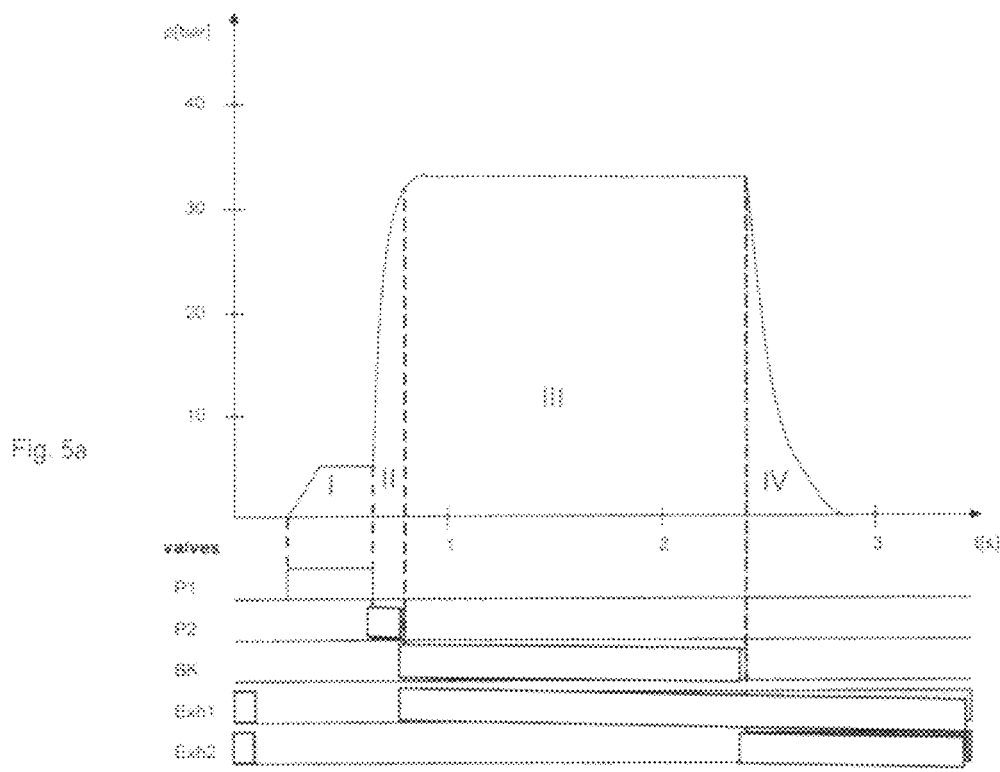
FIGS. 5a, 5b are the illustration of a blow moulding procedure at the end of a process or in the case of the last container before a gap respectively.
Figure 5B:
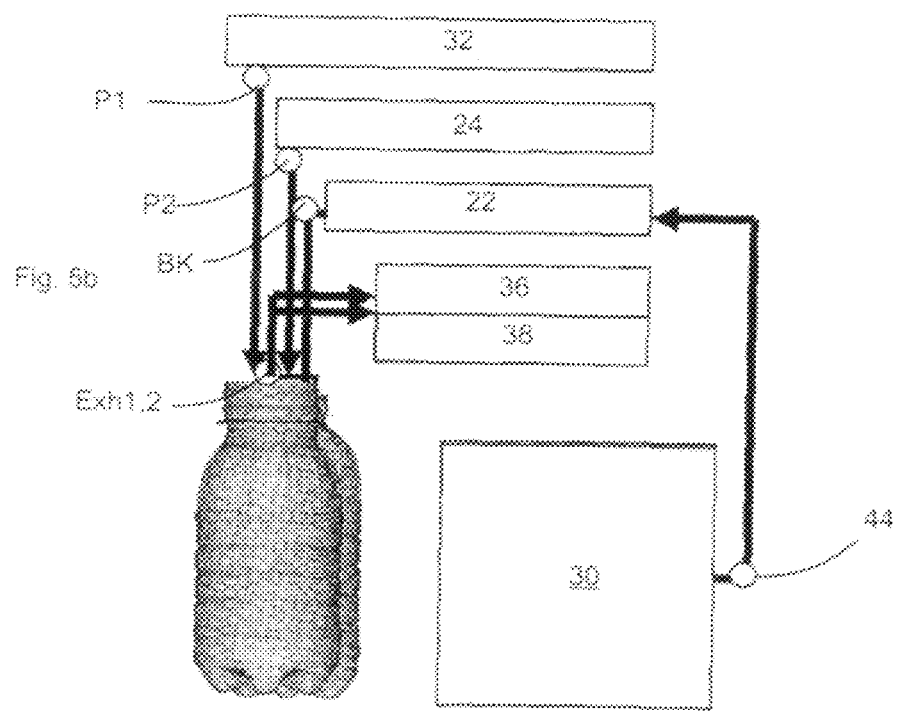

FIGS. 5a and 5b show the special case of the expansion of the last container. In this situation the compressor 30 supplies only the first gas preparation device 22 with compressed air, i.e. the preparation channel. In this situation, however, the circuitry of the valves P1, P2, BK, Exh1 and Exh2 is modified. Whereas in this case too only the valve P1 is opened at the beginning of the blow moulding process, in the case of the last container the valve P2 is opened only during the section II and is then closed again and the valve for the first gas preparation device 22 is opened during section III. In order to achieve a certain flow through the container in this case too, in section III the first outlet valve Exh1 is also opened. After the shaping of the container the outlet valve Exh2 is also additionally opened.

Figure 6A:
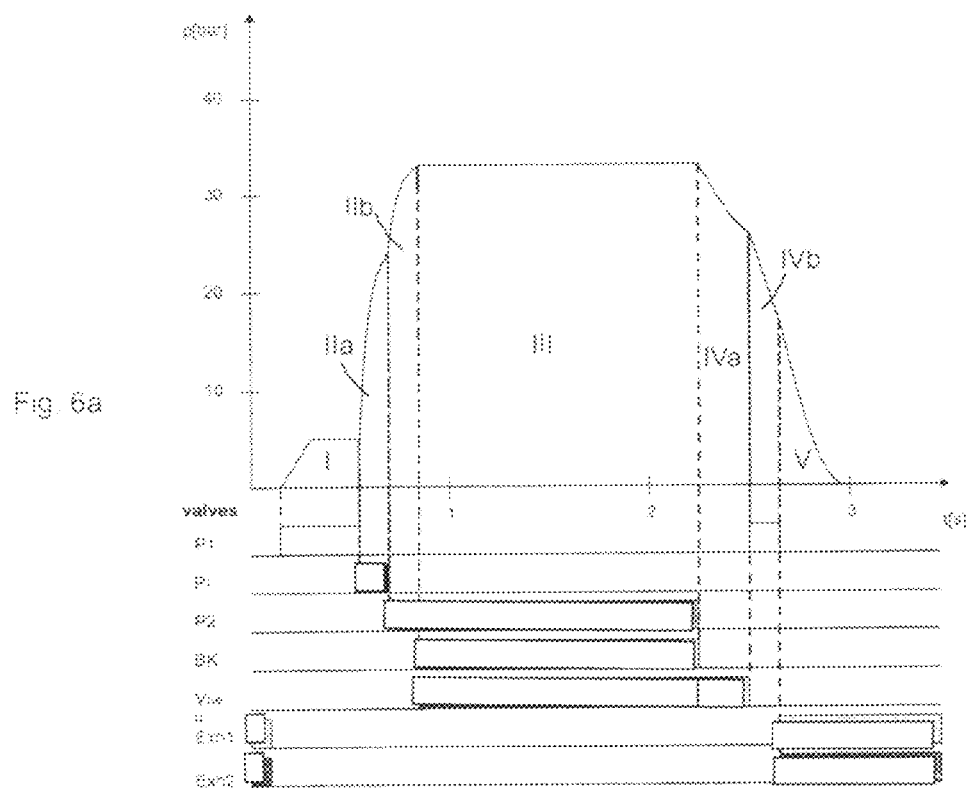
FIGS. 6a, 6b show a continuous operation in another embodiment of the disclosure.
Figure 6B:
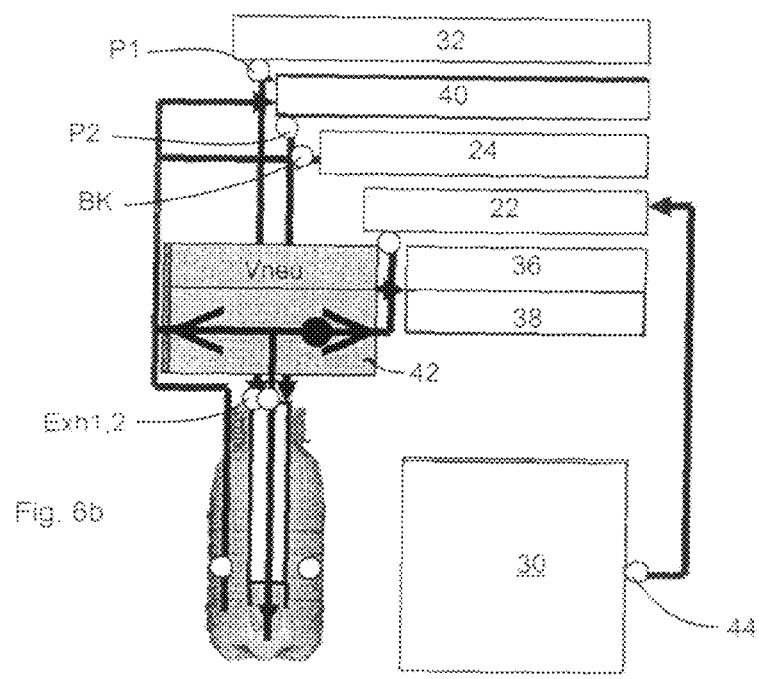

FIGS. 6a and 6b show a further modified method pattern. In detail, the section II is subdivided here into two part sections IIa and IIb and, in addition, the section IV is subdivided into the sections IVa and IVb. In this case in portion IVa it may be preferable for a reverse movement of the blow moulding air through the flushing or stretch rod to take place here. In terms of the apparatus, as well as the channels already mentioned previously, the apparatus also has an additional channel 40. This channel is referred to in the following as the PI channel. This channel also has a separate valve PI allocated to it. As well as this, an additional valve 42 is also provided here. This valve can also be provided as a non-return valve in the direction of the first gas preparation device. In addition, it is also possible for this valve 42 to allow two different switching settings, in which case flow from the container into the second gas preparation device 24 is possible in the switching setting 1 and a flow from the container into the PI channel 40 is possible in the switching setting 2. The residual pressure remaining in the container can be processed in a known manner. In particular, this residual pressure can be conveyed into the preliminary blow moulding channel 32 or recycled. The residual pressure then present in the container can then be conveyed by way of the outlet channels 36, 38, a simultaneous opening of the two outlet channels 36, 38 may be preferred.

This also becomes evident in the diagram reproduced in FIG. 6a, in which case in the portion IIa only the valve PI is opened and in the portion III the valve 42 is switched in such a way that air can pass out of the container into the second gas preparation device 24 on the one hand and into the PI channel on the other hand. In the region IVa the valve 42 is switched over and the air can now arrive in the PI channel 40. In this phase a reverse movement through the stretch rod 12 and, in this way, also a further cooling of the base can be carried out.

Figure 7A:
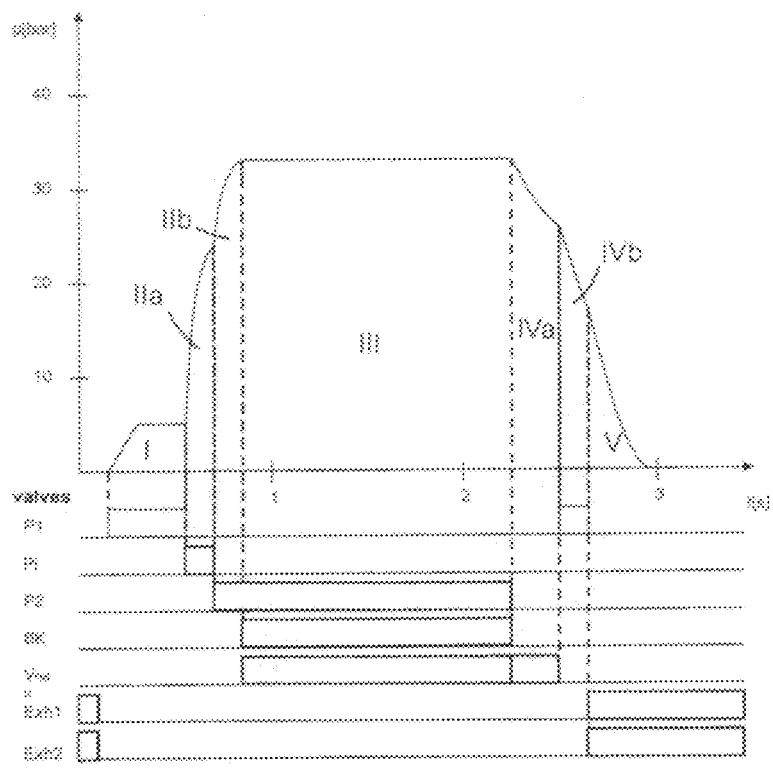
FIGS. 7a, 7b show a blow moulding procedure at the beginning or after a gap for the procedure described in FIGS. 6a, 6b, and FIGS. 8a, 8b are two illustrations for the last container in the blow moulding procedure as shown in FIGS. 6a, 6b.
Figure 7B:
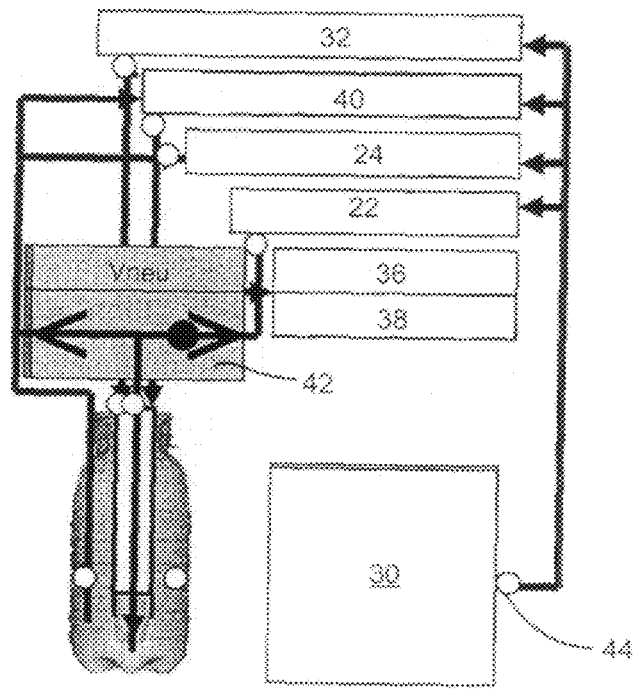

FIGS. 7a and 7b in turn reproduce an illustration, similar to the situation shown in FIG. 4a, i.e. the operating drive of the machine is just started, in which case, however, the additional PI channel 40 is also provided here. Reference is therefore made to the description with respect to FIG. 4a for a method pattern. First of all the preliminary blow moulding channel 32 is fed directly from the compressor 30, and then the container is first pre-blow moulded. After that, the compressor 30 feeds the PI channel 40 which further expands the container. In order to expand the container completely, the compressor 30 feeds the second gas preparation device 24. After that, the compressor 30 feeds the first gas preparation device 22, from which the air is conveyed in the first switching setting of the valve Vneu through the container into the second gas preparation device 24. As a result, a continuous and steady cooling effect takes place on the base of the container. In the subsequent second switching setting of the valve Vneu a further part of the residual pressure remaining in the container may be preferably recycled into the PI channel 40. The flow of the air passes in this case out of the container and through the flushing rod into the PI channel 40. After that, the residual pressure still remaining in the container is further processing in a known manner, for example by recycling the air into the preliminary blow moulding channel 32. The residual pressure finally remaining in the container can now be fed to the outlet channels 36, 38 by way of the container aperture.

Figure 8A:
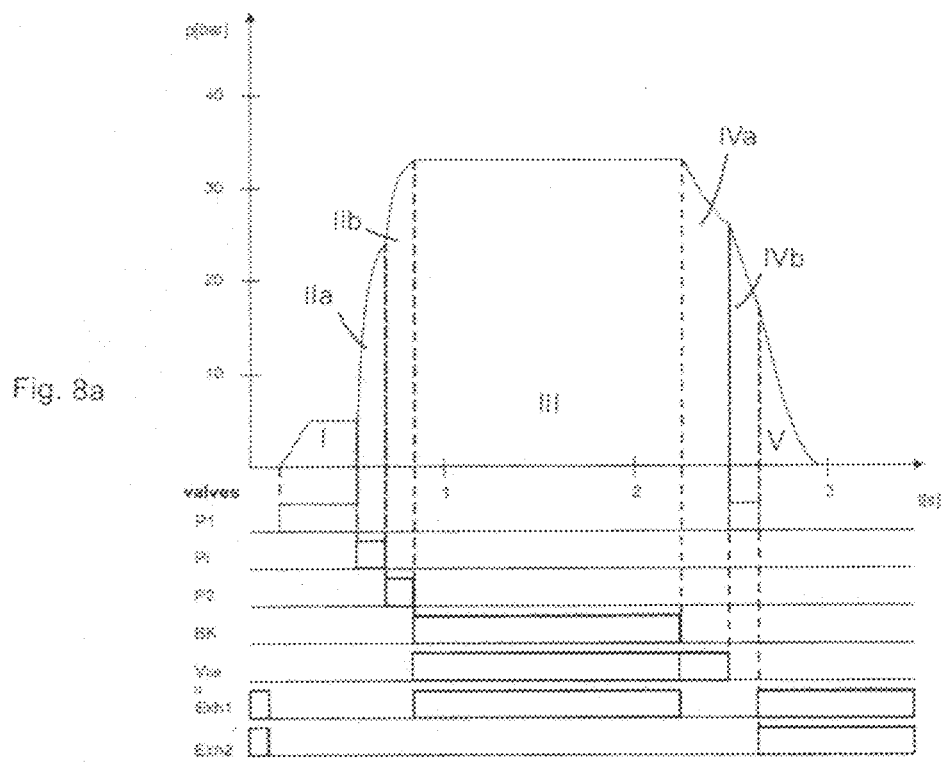
Figure 8B:
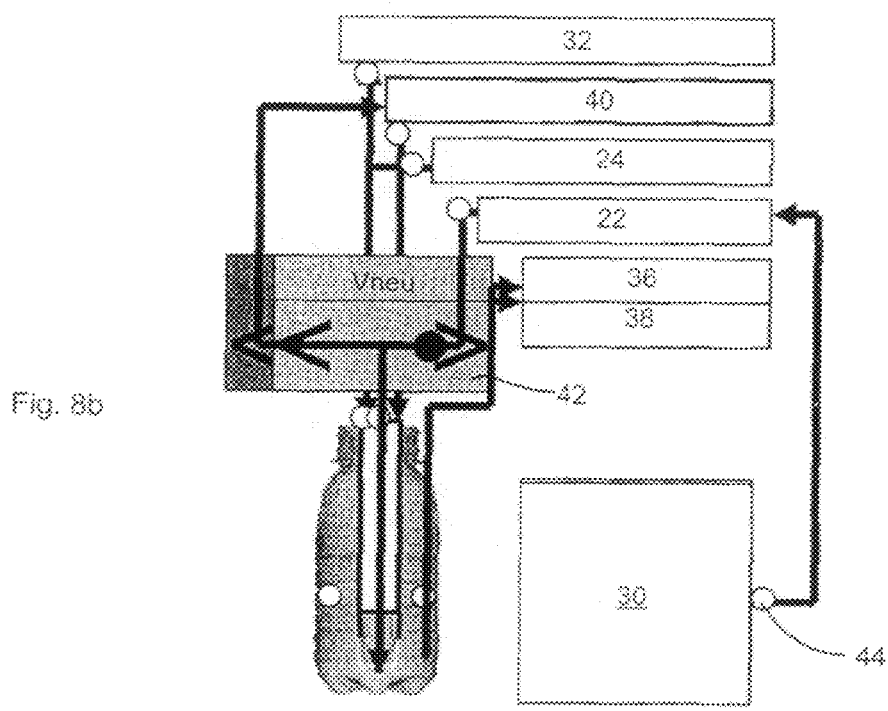

FIGS. 8a and 8b again show a situation similar to the situation shown in FIGS. 5a and 5b, i.e. the last container to be expanded in the production sequence, but in this case again for an apparatus with the additional PI channel. Reference is therefore likewise made to the above description of the figures (FIGS. 5a, 5b). As in FIGS. 5a and 5b, the container is first expanded through the preliminary blow moulding channel 32, the PI channel 40 and the second gas preparation device 24. After that, the valve Vneu is switched into the first switching setting, so that the air of the first gas preparation device 22, which is fed directly from the compressor 30, is conveyed through the container into the outlet channel 36 already opened. As a result, the necessary cooling effect of the base is achieved on the one hand, and a re-direction into the outlet channel 36 is achieved on the other hand. In this case the outlet channel 36 may be preferably designed in such a way that a continuous and steady air flow and thus a cooling of the container are achieved. In the second switching setting of the valve Vneu the air present in the container is first recycled into the PI channel 40. This flow may preferably take place in a reverse manner by way of the flushing rod. After that, it is possible for recycling to be carried out, in particular into the preliminary blow moulding channel 32. After that, the two outlet channels 36, 38 may be preferably opened at the same time, in order to release the container completely. It may therefore be preferable for the two outlet channels to be designed in such a way that they allow a different flow quantity and/or flow speeds for the issuing gas. It may be advantageous for the outlet channel 38 to allow a more rapid outlet of the issuing gaseous medium (or to have a larger flow cross-section respectively) than the outlet channel 36.

It will be apparent to those skilled in the art that various modifications and variations can be made to the blow moulding machine with cooling of the base in the stabilization phase of the present disclosure without departing from the scope of the invention. Throughout the disclosure, use of the terms "a," "an," and "the" may include one or more of the elements to which they refer. Other embodiments of the invention will be apparent to those skilled in the art from consideration of the specification and practice of the invention disclosed herein. It is intended that the specification and examples be considered as exemplary only.

What is claimed is:

1. An apparatus for expansion of plastics material containers, comprising:
   a conveying device that conveys plastics material containers along a pre-set conveying path;
   at least one first shaping station arranged on and conveyed by the conveying device, the at least one first shaping station being configured to expand the plastics material containers by acting upon them with a gaseous medium;
   at least one second shaping station arranged on and conveyed by the conveying device, the at least one second shaping station being configured to expand the plastics material containers by acting upon them with a gaseous medium, the first shaping station and the second shaping station having stretch rods in each case for stretching the plastics material containers to be expanded in longitudinal directions thereof, each said stretch rod having a channel by way of which a gaseous medium is capable of being supplied through the stretch rod to the plastics material containers to be expanded;

at least one first gas preparation device that makes a gaseous medium under pressure available at least for a time to the first shaping station, said gaseous medium being supplied at least for a time through the stretch rod to the plastics material containers to be expanded in the first shaping station; and a second gas preparation device fluidly connected to an inner space of the plastics material containers to be expanded in the first shaping station in such a way that a gas flowing between the second gas preparation device and the inner space of the plastics material containers flows between the stretch rod and a wall of the plastics material containers, the first gas preparation device and the second gas preparation device being connected in terms of flow at least for a time by way of the inner space of the plastics material containers arranged in the first shaping station, said second gas preparation device also being connected in terms of flow to a plastics material container present in the second shaping station, wherein pressure ratios of the first gas preparation device and of the second gas preparation device are selected in such a way that a gas flow from the first gas preparation device to the second gas preparation device takes place at least for a time, whereupon whilst the container is produced by preliminary and finishing blow moulding, nevertheless the blow moulding gas does not originate directly from a compressor but it is re-directed such that, the blow moulding gas is conveyed from a compressor into the first gas preparation device, and from there the blow moulding air is conveyed by way of the flushing or stretch rod through the already completely shaped containers to the second gas preparation device, during the pressure and cooling phases.

2. An apparatus according to claim 1, wherein the pressure ratios of the first gas preparation device and of the second gas preparation device are chosen in such a way that pressures made available by these gas preparation devices differ from one another by less than 30%.

3. An apparatus according to claim 1, wherein the pressure ratios of the first gas preparation device and of the second gas preparation device are chosen in such a way that pressures made available by these gas preparation devices differ from one another by less than 20%.

4. An apparatus according to claim 1, wherein the pressure ratios of the first gas preparation device and of the second gas preparation device are chosen in such a way that pressures made available by these gas preparation devices differ from one another by less than 10%.

5. An apparatus according to claim 1, wherein the second shaping station is arranged downstream of the first shaping station with respect to a conveying movement of the plastics material containers.

6. An apparatus according to claim 1, wherein the first gas preparation device, for a time, makes the gaseous medium under pressure available for expansion and/or stabilization of a plastics material container to be expanded in the second shaping station.

7. An apparatus according to claim 6, further comprising a control device which has an effect that a first period of time in which the first gas preparation device makes the gaseous medium available to the first shaping station and a second period of time in which the first gas preparation device makes the gaseous medium available to the second shaping station are staggered at least in part.

8. An apparatus according to claim 1, wherein the apparatus has a plurality of shaping stations, and all shaping stations in the plurality of shaping stations are connected in terms of flow to the at least one first gas preparation device at least for a time.

9. An apparatus according to claim 1, wherein at least one gas preparation device is an annular channel.

10. An apparatus according to claim 1, wherein at least one stretch rod has a gas outlet opening in an end portion of the stretch rod.

11. The apparatus according to claim 1, wherein supplying of the gaseous medium to the first shaping station by the at least one first gas preparation device comprises directing the gaseous medium through the stretch rod to a portion of each container in the plastics materials containers in order to stabilize this portion of the each container.

12. The apparatus according to claim 1, wherein each container in the plastics materials containers is expanded, even before supplying of the gaseous medium through the stretch rod, by being acted upon with the gaseous medium.

13. The apparatus according to claim 1, wherein the first shaping station releases each container in the plastics materials containers from pressure after expansion thereof, wherein said pressure release takes place through the stretch rod at least for a time.

14. The apparatus according to claim 1, wherein expansion of a plastics material container in the at least one first shaping station and expansion of a plastics material container in the at least one second shaping station take place in a manner staggered in time.

15. The apparatus according to claim 1, wherein essentially a same pressure level is present in the at least one first gas preparation device, in each container in the plastics materials containers, and in the at least one second gas preparation device, at least during finishing of blow moulding of the each container and/or during flushing of the each container.

16. The apparatus according to claim 1, wherein the conveying device is downstream of the first shaping station with respect to a conveying movement of the plastics material containers.

17. The apparatus according to claim 1, wherein gas flow through the containers is limited as it is consumed for the production of the containers by the second gas preparation device.

18. The apparatus according to claim 1, wherein following finishing blow moulding, the gas is flowed out of the formed container by way of the stretch rods and recycled.

19. The apparatus according to claim 1, wherein following the finishing blow moulding, the gas is collected by way of a further gas preparation device, or recycled.

20. An apparatus for expansion of plastics material containers, comprising:

a conveying device that conveys plastics material containers along a pre-set conveying path;

at least one first shaping station arranged on and conveyed by the conveying device, the at least one first shaping station being configured to expand the plastics material containers by acting upon them with a gaseous medium;

at least one second shaping station arranged on and conveyed by the conveying device, the at least one second shaping station being configured to expand the plastics material containers by acting upon them with a gaseous medium, the first shaping station and the second shaping station having stretch rods in each case for stretching the plastics material containers to be expanded in longitudinal directions thereof, each said stretch rod having a channel by way of which a gaseous medium is capable of being supplied through the stretch rod to the plastics material containers to be expanded;

at least one first gas preparation device that makes a gaseous medium under pressure available at least for a time to the first shaping station, said gaseous medium being supplied at least for a time through the stretch rod to the plastics material containers to be expanded in the first shaping station; and a second gas preparation device fluidly connected to an inner space of the plastics material containers to be expanded in the first shaping station in such a way that a gas flowing between the second gas preparation device and the inner space of the plastics material containers flows between the stretch rod and a wall of the plastics material containers, the first gas preparation device and the second gas preparation device being connected in terms of flow at least for a time by way of the imer space of the plastics material containers arranged in the first shaping station, said second gas preparation device also being connected in terms of flow to a plastics material container present in the second shaping station, wherein pressure ratios of the first gas preparation device and of the second gas preparation device are selected in such a way that a gas flow from the first gas preparation device to the second gas preparation device takes place at least for a time, and wherein the pressure ratios of the first gas preparation device and of the second gas preparation device are chosen in such a way that pressures made available by these gas preparation devices differ from one another by less than 20%.

* * * * *